Patented Apr. 15, 1952

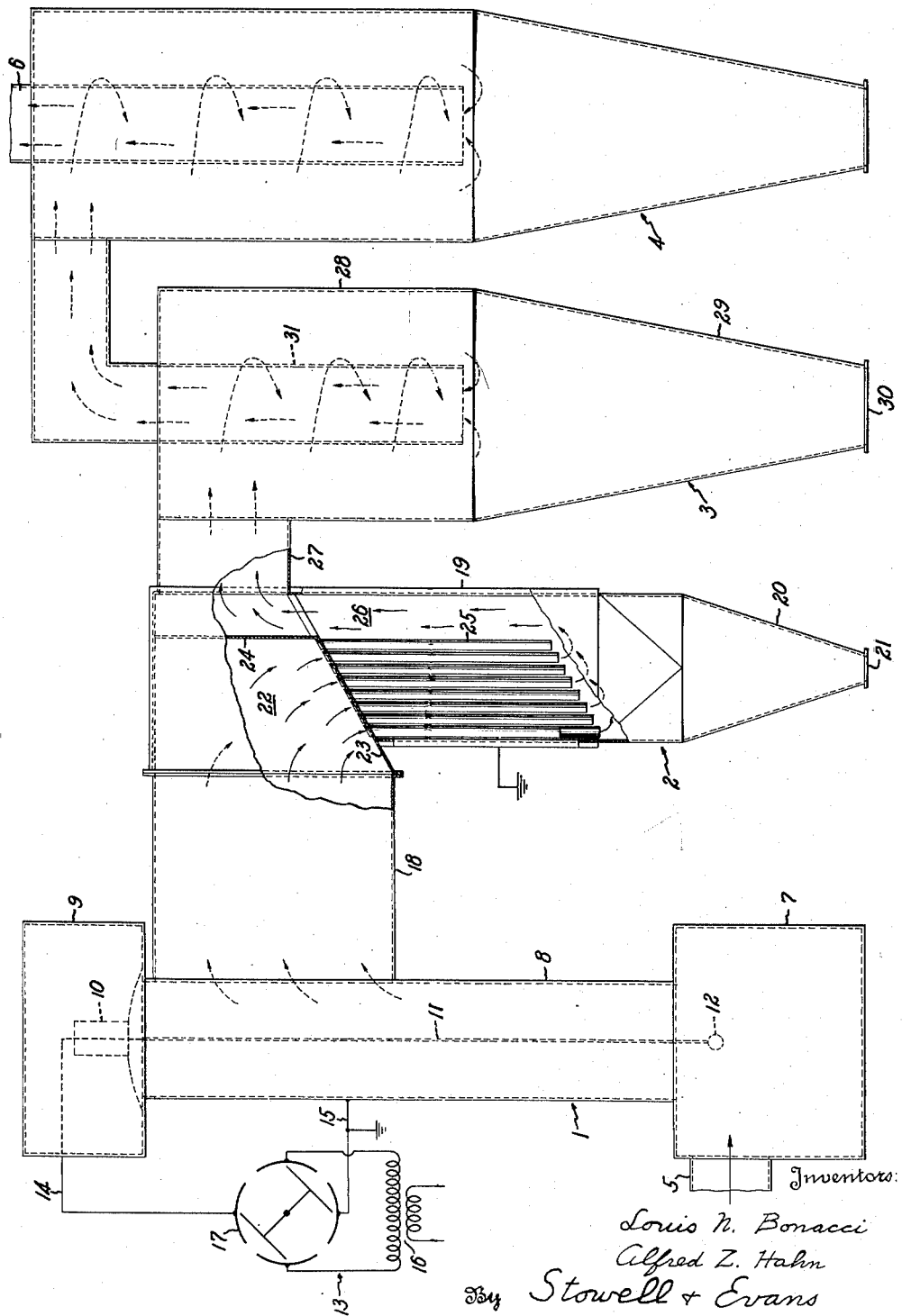

2,593,251

UNITED STATES PATENT OFFICE 2,593,251

MATERIAL COLLECTING APPARATUS

Louis N. Bonacci, Pampa, Tex., and Alfred Z. Hahn, Bound Brook, N. J., assignors to Research Corporation, New York, N. Y., a corporation of New York Application June 18, 1946, Serial No. 677,558

7 Claims. (Cl. 183—7)

This invention relates to material collecting apparatus and more particularly to apparatus wherein gas containing suspended particles to be collected is successively treated to charge the suspended particles, to flocculate the charged particles and to collect the flocculated particles.

An object of the invention is to provide an improved material collecting apparatus which is particularly efficient in the separation and collection of extremely fine particles suspended in a gas stream. The invention has found effective application in the separation of carbon black from products of combustion, an application in which the separation problem is difficult because of the extreme fineness of the carbon black particles. Although the apparatus of the invention may be employed to good advantage for the collection of carbon black, its uses are not so limited; it may also be used generally for treating air or industrial gases carrying various kinds of suspended matter such as dust, mist, cement particles, tarry particles and the like.

Another object is to provide in a suspended material collecting system including an electrical precipitator and a cyclone or other centrifugal separator for catching particles not removed in the precipitator, a chamber wherein charged particles carried by the gas stream from the electrical precipitator are flocculated, and in part removed from the gas stream, prior to treatment in the centrifugal separator. In such a system, the collecting efficiency of the cyclone separator is enhanced by the flocculation of particles in the flocculating chamber, and the over-all collection efficiency of the system is greatly improved.

Typically, the apparatus of the invention may include a gas stream conduit having located therewithin, successively in the direction of gas flow, particle-charging means, means for constraining the gas stream into a relatively narrow path of substantial extent in the direction of flow, and particle-collecting means. Preferably the particle-charging means is an electrical precipitator in which some collection of particles may take place. Preferably, also, the particle-collecting means is a cyclone or centrifugal separator or a number of them in series or parallel. Specifically, the gas stream constraining means includes a plurality of parallel pipes of small cross-section relative to the cross-section of the gas stream, means for constaining the gas stream to flow through the pipes, and means for abruptly deflecting the gas stream to separate a portion of the particulate matter suspended in the gas stream.

The invention will be more particularly described in, and other of its objects and advantages will be pointed out or inferable from, the following description taken in connection with the accompanying drawing in which the single figure shows in elevation a preferred embodiment of the invention, parts being broken away to show interior construction.

In the drawing, reference numeral 1 denotes an electrical precipitator, numeral 2 refers generally to a flocculating chamber, and numerals 3 and 4 denote centrifugal separators. The gas stream to be treated enters the apparatus through inlet 5 located near the bottom of the precipitator, flows generally from left to right in the direction of the arrows as seen in the figure, and emerges through gas outlet 6 at the top of the final separator 4.

For purposes of illustration, the apparatus will be described in connection with the removal of carbon black from combustion and decomposition products, diluted or undiluted with air or other gas, but it will be understood that the apparatus may be used for other material collecting operations.

The electrical precipitator indicated diagrammatically at 1 is of the pipe and wire type, having a lower chamber 7, for the collection of precipitated material, surmounted by a vertical hollow cylindrical member 8, which, in turn, is capped by a housing 9. Suspended from an insulating bushing 10, located within the housing 9 for protection against the elements, is a fine wire electrode 11. A tensioning weight 12 is attached to the lower end of the fine wire electrode to hold the electrode taut in the gas stream and out of short circuiting contact with the tubular member 8. A source of high potential electricity, shown diagrammatically at 13, supplies current to the complementary electrode system through lead wires 14 and 15, the latter being grounded. The source 13 is of conventional design and includes a transformer 16 and synchronous rectifying switch 17.

It will be understood by those skilled in the art that the diagrammatic showing of the electrical precipitator at 1 is intended as a generic representation of means for providing an ionizing discharge in a high tension electric field between spaced electrodes.

The gas stream is conducted from the electrical precipitator to the flocculating chamber 2 through a conduit 18.

The flocculating chamber has a casing 19, which may be rectangular in cross-section, and a hopper 20 at the bottom, which may be in the form of an inverted pyramidal frustum. The hopper provides a receptable for dust particles that are separated from the gas stream in the flocculating chamber, and, for the purpose of removing collected dust from the hopper, a door 21 may be provided at the bottom. The upper part of the flocculating chamber housing provides a gas inlet header 22 having a header plate 23 and a vertical partion 24 which separate the header compartment from the rest of the flocculating chamber.

A plurality of parallel pipes 25 are suspended from the header plate 23, the upper ends of the pipe lengths being received in holes formed in the header plate and being secured to the header plate as by welding. In the construction shown, the pipes are of the same length and fit into a sloping header plate, an arrangement which makes for uniform gas distribution and treatment and tends to prevent the building up of deposits on the header plate. As indicated by the arrows, the gas streams emerging from the lower ends of the pipes 25 are abruptly deflected and turned back through the channel 26 to flow out of the flocculating chamber through conduit 27 to the separators 3 and 4. The abrupt change in direction that is imparted to the gases emerging from the pipes 25 serves to throw out of the gas stream and into the hopper 20 some of the suspended particulate matter.

If desired, a suitable device may be provided for rapping the pipes 25 to dislodge dust which may accumulate upon them. Also, a mechanical scraper mechanism may be employed for the purpose of keeping the inside of the hopper 20 clean and free from caked material.

In a typical flocculating chamber, pipes having an inside diameter of 6 inches and a length of 12 feet, 6 inches, are found to be effective.

Centrifugal separators 3 and 4 are conventional in design. They are substantially identical and are arranged in series. One of them—that designated by the numeral 3—will be briefly described.

Separator 3 has an upper cylindrical part 28, a lower inverted frusto-conical hopper 29, and a clean-out door 30. Extending down through the top of the separator, and coaxially positioned with respect to the separator axis, is a pipe outlet 31. The conduit 27 leads the stream of gas tangentially into the centrifugal separator. The general flow lines through the separator are indicated by the arrows. Centrifugal action throws suspended matter carried by the gases to the outer walls of the separator where it collects and/or drops to the hopper 29 for subsequent removal through door 30. As is conventional, rapping or scraping devices may be employed to remove caked material from the walls of the separator.

In operation, gas bearing, for example, carbon black, is circulated through the apparatus. In the precipitator, the carbon black particles are charged and in part precipitated, as will be understood by persons skilled in the art. In the flocculating chamber, the gas stream, bearing charged particles of carbon black, is split into a number of smaller streams which flow through the cluster of pipes 25. In these pipes substantial discharging and flocculation take place. The mechanism of flocculation is not thoroughly understood, but test evidence indicates that flocculation does occur. The gas stream is reformed from the separate streams issuing from the pipe cluster and its direction of flow is sharply changed due to the construction of the flocculating chamber. Some separation of suspended carbon black flocks takes place due to centrifugal action occasioned by the turning of the gas stream. An additional increment of suspended carbon black is removed in separator 3 and the final increment is removed in separator 4. Cleaned gases leave the apparatus through the outlet 6.

Although, as stated, the exact mechanism of flocculation is not understood, it is believed that flocculation is enhanced by contact of the gas stream bearing charged particles with the extended surface provided by the cluster of pipes 25. The pipe surfaces are electrically conductive and are grounded, or at least maintained at a preselected potential in operation for the purpose of drawing off at least a part of the electrical charge of the particles to assist flocculation. In the exemplary apparatus herein shown and described, the pipes 25 are of steel or other suitable metal construction and are grounded through the metallic casing 19.

Having described a preferred embodiment of the invention and its mode of operation, it will be obvious that various changes in form and arrangement may be made in the illustrative embodiment without departing from the principles of the invention as defined in the claims.

We claim:

1. Apparatus for removing suspended particles such as carbon black from gases comprising means defining a gas stream conduit having located therewithin successively in the direction of gas flow particle-charging means including means for subjecting the gas stream to corona discharge, means including a plurality of elongated conduits for constraining the gas stream to flow in parallel into a plurality of relatively narrow paths of substantial extent in the direction of flow, and particle-collecting means.

2. Apparatus for removing suspended particles such as carbon black from gases comprising means defining a gas stream conduit having located therewithin successively in the direction of gas flow particle-charging means including means for subjecting the gas stream to corona discharge, a flocculating chamber including a plurality of elongated conduits for dividing the gas stream into a plurality of smaller parallel streams of substantial length, and particle-collecting means.

3. Apparatus as defined in claim 2 wherein means is provided for maintaining said pipes at a preselected potential.

4. Apparatus for removing suspended particles such as carbon black from gases comprising means defining a gas stream conduit having located therewithin successively in the direction of gas flow particle-charging means including means for subjecting the gas stream to corona discharge; a flocculating chamber including a plurality of parallel pipes of small cross-section relative to the cross-section of the gas stream, means for constraining the gas stream to flow through said pipes, means for reuniting said stream and means for deflecting said gas stream abruptly to separate a portion of the particulate matter suspended in the gas stream; and particle-collecting means.

5. Apparatus as defined in claim 4 wherein said particle-collecting means consists of two centrifugal separators arranged in series.

6. Gas cleaning apparatus for removing suspended particles such as carbon black from a gas stream which comprises means defining a gas stream conduit having located therewithin successively in the direction of gas flow a combined electrical precipitator and particle-charging means including means for subjecting the gas stream to corona discharge; a flocculating chamber including a plurality of pipes of small cross-section relative to the cross-section of the gas stream, means for constraining the gas stream to flow through said pipes and means for reuniting the gas stream; and centrifugal means for separating particulate matter from the gas stream.

7. Gas cleaning apparatus for removing suspended particles such as carbon black from a gas stream which comprises means defining a gas stream conduit having located therewithin successively in the direction of gas flow a combined electrical precipitator and particle-charging means including means for subjecting the gas stream to corona discharge; a flocculating chamber including a plurality of parallel pipes of small cross-section relative to the cross-section of the gas stream, means for constraining the gas stream to flow through said pipes, means for reuniting said stream and means for deflecting said gas stream abruptly to separate a portion of the particulate matter suspended in the gas stream; and centrifugal means for separating particulate matter from the gas stream.

LOUIS N. BONACCI.
ALFRED Z. HAHN.

REFERENCES CITED

The following references are of record in the file of this patent:

UNITED STATES PATENTS

| Number | Name | Date |
|---|---|---|
| 852,122 | Kinealy | Apr. 20, 1907 |
| 1,130,213 | Steere | Mar. 2, 1915 |
| 1,130,214 | Steere | Mar. 2, 1915 |
| 1,853,393 | Anderson | Apr. 12, 1932 |
| 2,114,682 | Gumaer | Apr. 19, 1938 |
| 2,216,390 | Hawley | Oct. 1, 1940 |
| 2,368,823 | Hanson | Feb. 6, 1945 |